United States Patent
Jiang (10) Patent No.: US 11,069,449 B2
(45) Date of Patent: Jul. 20, 2021

(54) ELECTROCHEMICALLY MODULATED MOLTEN SALT REACTOR

(71) Applicant: Energy, United States Department of, Washington, DC (US)

(72) Inventor: Junhua Jiang, Idaho Falls, ID (US)

(73) Assignee: Department of Energy, Washington, DC (US)

( * ) Notice: Subject to any disclaimer, the term of this patent is extended or adjusted under 35 U.S.C. 154(b) by 320 days.

(21) Appl. No.: 16/259,198

(22) Filed: Jan. 28, 2019

(65) Prior Publication Data
US 2020/0243207 A1 Jul. 30, 2020

(51) Int. Cl.
| | |
|---|---|
| G21C 1/03 | (2006.01) |
| G21C 1/16 | (2006.01) |
| G21C 5/12 | (2006.01) |
| G21C 3/54 | (2006.01) |
| G21C 1/22 | (2006.01) |
| G21C 3/60 | (2006.01) |
| G21C 1/26 | (2006.01) |

(52) U.S. Cl.
CPC ............ G21C 1/16 (2013.01); G21C 1/03 (2013.01); G21C 1/22 (2013.01); G21C 3/54 (2013.01); G21C 5/126 (2013.01); G21C 1/26 (2013.01); G21C 3/60 (2013.01)

(58) Field of Classification Search
CPC . G21C 1/16; G21C 3/54; G21C 5/126; G21C 1/03; G21C 1/22; G21C 3/60
USPC ........................................................ 376/360
See application file for complete search history.

(56) References Cited

U.S. PATENT DOCUMENTS

2017/0243664 A1 * 8/2017 Scott ..................... G21C 1/03

FOREIGN PATENT DOCUMENTS

WO WO-2018229265 A1 * 12/2018 ............... G21C 1/22

OTHER PUBLICATIONS

LeBlanc, "Molten salt reactors: A new beginning for an old idea", Nuclear Engineering and Design 240, No. 6 (2010): 1644-1656. (Year: 2010).*
Koger, "Alloy compatibility with LiF—BeF2 salts containing ThF4 and UF4", ORNL-TM-4286, Oak Ridge National Lab, 1972. (Year: 1972).*

* cited by examiner

Primary Examiner — Jack W Keith
Assistant Examiner — Daniel Wasil
(74) Attorney, Agent, or Firm — Felisa L. Lelsinger; Michael J. Dobbs; Brian J. Lally (57) ABSTRACT

An electrochemically modulated molten salt reactor (EMMSR) that contains a vessel and a power source. The vessel houses a fuel salt, at least a portion of a neutron moderator, and at least a portion of an insulator. The fuel salt includes enough dissolved fissile isotopes to cause continued self-sustaining fission reactions during the operation of the EMMSR. The neutron moderator is configured to slow down fast neutrons produced by the dissolved fissile isotopes. The insulator is configured to electrically isolate the neutron moderator from the vessel. The power source has a positive potential and a negative potential. The positive potential is received by the neutron moderator and the negative potential is received by the vessel.

16 Claims, 7 Drawing Sheets

ELECTROCHEMICALLY MODULATED MOLTEN SALT REACTOR

GOVERNMENT INTERESTS

The United States Government has rights in this invention pursuant to Contract No. DE-AC07-05ID14517 between the U.S. Department of Energy (DOE) and Battelle Energy Alliance.

FIELD OF THE INVENTION

The present invention relates to an electrochemically modulated molten salt reactor.

BACKGROUND OF THE INVENTION

Molten salt reactors (MSRs) have been considered a front-runner among currently developed next-generation nuclear technologies because they potentially offer a safer, more efficient, and sustainable form of nuclear power associated with on-line fuel processing. MSRs run at a much higher temperature, up to approximately 750° C., than traditional light-water-reactors and operate at near atmospheric pressure. MSRs are not cooled by water, which minimize the chances of a steam explosion. Several conceptual MSRs have been proposed and studied using different fuel and salt compositions, mainly chlorides and fluorides in the past few decades. However, the implementation of the proposed designs is hindered by serious technological challenges associated with the complexity of molten fuel salt chemistry, and a shortened lifetime of structural materials.

The composition of molten fuel salt can change dramatically during operation of the MSR. The molten fuel salt becomes unstable as it is greatly affected by fission products and operating conditions, causing instability, corrosion of MSR components, and unsafe operating conditions. Therefore, there is an urgent need to develop transformational MSR technologies to address these challenges and further improve reactor performance.

SUMMARY OF THE INVENTION

In one aspect, an electrochemically modulated molten salt reactor (EMMSR) that contains a vessel and a power source. The vessel houses a fuel salt, a neutron moderator, and an insulator. The fuel salt includes enough dissolved fissile isotopes to cause continued self-sustaining fission reactions during the operation of the EMMSR. The neutron moderator is configured to slow down fast neutrons produced by the dissolved fissile isotopes, the insulator is configured to electrically isolate the neutron moderator from the vessel. The power source has a positive potential and a negative potential. The positive potential is received the neutron moderator, and the negative potential is received by the vessel.

BRIEF DESCRIPTION OF THE DRAWINGS

Embodiments of the present invention are illustrated in the accompanying figures where.

DETAILED DESCRIPTION OF THE INVENTION

The following detailed description provides illustrations for embodiments of the present invention. Each example is provided by way of explanation of the present invention, not in limitation of the present invention. Those skilled in the art rill recognize that other embodiments for carrying out or practicing the present invention are also possible. Therefore, it is intended that the present invention covers such modifications and variations as come within the scope of the appended claims and their equivalents.

Figure 1:
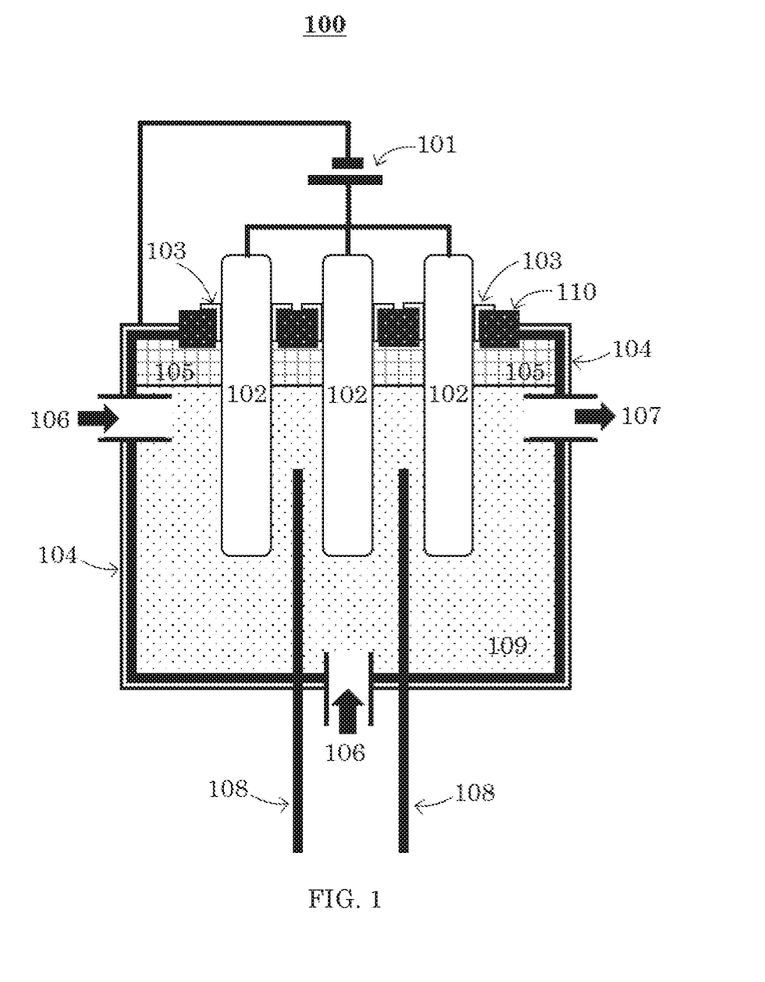
FIG. 1 is a schematic illustration of the EMMSR according to an embodiment of the present invention.

Referring to FIG. 1, a schematic illustration of an embodiment of this invention is shown. In the electrochemically moderated molten salt reactor (EMMSR or reactor) 100, the neutron moderator 102 is electrically isolated from the vessel 104 by an insulator 103. During the electrochemical modulation, the reactor is utilized as an electrochemical cell, and appropriate electrical signals are applied between the neutron moderator 102 and the vessel 104 from the power source 101.

The power source 101 is any source of power that is capable of generating an electrical current sufficient to operate the EMMSR 100. For example, the power source 101 can be a digital or analog direct-current power source that can provide various electrical signals to the EMMSR 100. The signals can include constant or pulse voltages and currents. The power source 101 can include other elements to help control one or more electrical variables, including a potentiostat, galvanostat, or other instruments for similar purposes. The power source 101 enables the electrochemical modulation of the neutron moderator 102, the vessel 104, or both the neutron moderator 102 and vessel 104. As discussed in reference to FIG. 4, a positive potential can be applied to the neutron moderator 102 and a negative potential can be applied to the vessel 104. In this configuration the electrochemical modulation drives salt anions 303, such as F⁻, and $UF_7^{3-}$ and $UF_7^{4-}$, to move to the surfaces of the neutron moderator 102, and salt cations 304, such as Li⁺, to move to the inner surfaces of the vessel 104.

The fuel salt 109 is a melt containing dissolved fissile isotopes that produce fast neutrons. The fuel salt 109 is compatible with high-temperature alloys, graphite, and ceramics. The fuel salt 109 contains dissolved fissile isotopes in a concentration sufficient to cause continued self-sustaining fission reactions. The fuel salt 109 can be any chloride, fluoride, or combination of chlorides and fluorides that enable the operation of the EMMSR 100 in the temperature range of approximately 500° C. and 800° C. If the fuel salt 109 is a fluoride, it may be LiF—BeF$_2$, NaF—BeF$_2$, LiF—NaF—KF, NaF—Zr$_4$, or LiF—NaF—ZrF$_4$. If the fuel salt 109 is a chloride, it may be LiCl—KCl, NaCl—MgCl$_2$, KCl—MgCl$_2$, LiCl—RbCl, and LiCl—KCl—MgCl$_2$. Beyond the fluoride and chloride salts, familiar oxygen-containing salts (nitrates, sulfates and carbonates) are less suitable because they do not possess the necessary thermochemical stability at high temperatures relevant to the EMMSR 100 operation and they are also incompatible with the use of carbon materials. The fuel salt 109 is made from fluorides or chlorides because they are good heat transfer media with large specific heats, large thermal-expansion co-efficients, have low viscosity. The fuel salt 109 can be introduced into the EMMSR 100 through a pump from a fuel tank. If the EMMSR undergoes continuous refueling, the refueling rate is determined by the operation parameters, such as power density, inlet 106 and outlet 107 temperatures, of the reactor, the capabilities of materials, and safety control. The flow rate can be adjusted, such as from approximately 0.1 m/s to approximately 10 m/s, to control the power output. An emergency shutdown is enabled by conventional control valves that can be secured electromagnetically in the event of power failure or other situation requiring immediate shut down of the EMMSR 100.

The dissolved fissile isotopes can include an actinide element that will split when it absorbs a neutron such as Uranium, Plutonium, or Thorium. The fissile isotopes are present within the fuel salt 109 up to approximately 15 wt %, and preferably between approximately 1 and 10 wt %. The fuel salt 109 can also act, indirectly, as a moderator, negative thermal reactivity feedback mechanism, heat transfer medium, and natural drive mechanism for decay heat removal.

The neutron moderator 102 is any component capable of slowing down fast neutrons produced by the dissolved fissile isotopes from the fuel salt 109. For example, the neutron moderator 102 can be conductive carbons, metals, alloys, or a combination of conductive carbons, metals, and alloys. Carbons could include nuclear-grade graphite, amorphous carbon, and their composites. Metals or alloys could include zirconium, beryllium, or their oxides with low cross-section of neutron adsorption. The neutron moderator 102 can be composites of conductive carbons, conductive metals, or oxides of Zr and Be. At least a portion of the neutron moderator 102 is within the vessel 104, but enough of the neutron moderator 102 must be within the vessel 104 to moderate fast neutrons.

The insulator 103 is any component capable of electrically isolating the neutron moderator 102 from the vessel 104. The insulator 103 is made from high temperature inorganic materials such as mica, ceramics, and concretes. The insulator 103 must have a low neutron-adsorption cross-section and good chemical and mechanical stability at the operating temperature of the EMMSR 100. Moreover, insulator 103 can also tolerate the irradiation of neutron, alpha, and beta rays, and the attack by fission products. Preferable ceramic materials are alumina, stabilized zirconia, magnesia, silicon carbon, and zirconium carbide. The shape of the insulator is determined by the design of the neutron moderator 102 and the connection between the neutron moderator 102, the insulator 103, and the vessel 104. A portion of the insulator 103 may be within the vessel 104. A rod holder 110 can be used to stabilize the neutron moderator 102 and the insulator 103. The rod holder 110 can be made from high-strength ceramic, graphite, metal alloys, or their combinations. The insulator 103 can be made from ceramic-based shoulder sleeves, sleeve bushings, flange bushings, ceramic O-rings, short tubing, piping, or fittings. For example, if the insulator 103 surrounds the neutron moderator 102 from the vessel 104, the center opening of the insulator 103 can be in the shape of the neutron moderator 102. For example, if the neutron moderator 102 is circular, cubic, or hexagonal, the insulator 103 center opening would be the same. However, in all geometries, the insulator 103 electrically isolates the neutron moderator 102 from the vessel 104.

The vessel 104 is any container capable of housing the components of the EMMSR 100. The vessel 104 can be substantially cylindrical or a rectangular prism. The vessel 104 is electrically isolated from the neutron moderator 102. The vessel 104 is made from metal alloys that are stable in the fuel salt 109. Metal alloys can be easily attached to by molten fluorides or chlorides because their surface oxide films, which normally protect the metals from corrosion by water or air, dissolve in the fuel salt 109. The metal alloy itself must be chemically stable in terms of dissolution of its constituent metal into the fuel salt 109 through an oxidation process by oxidative compounds such as $UF_7^{3-}$ and $ICl_7^{3-}$. The main alloy component vulnerable to oxidation is chromium. Based on the control of the concentration of the oxidative compounds, few nickel alloys exhibit good stability in the salt. In this invention, the electrochemical modulation can considerably expand the choice of the alloys. Besides a range of nickel alloys, stainless steels and other alloys can also be employed as the vessel 104 material.

The gas phase 105 is a space within the vessel 104 designed to hold the gaseous fission products, such as Xe and Kr, and harmful volatiles such as HF that are produced from the fuel salt 109. The gas phase 105 mitigates the corrosion of the vessel 104 and other EMMSR 100 components by fission products and the salt released from the fuel salt 109. The gas phase 105 improves the safety and control of the reactor by providing a space for the corrosive elements to go, instead of allowing the corrosive elements to fester in the fuel salt 109 or otherwise attack the vessel 104 or other EMMSR 100 components. The gas phase 105 can be purged to empty the vessel 104 of the gaseous fission products using an inert gas such as helium or argon. The gas phase 105 can facilitate the direct detection of gas phase 105 composition, temperature, and pressure through the introduction of in-reactor sensors within the gas phase 105.

The vessel 104 receives the fuel salt 109 from at least one inlet 106. The inlet 106 is designed to allow the addition of other components for adjusting the fuel salt 109 chemistry as necessary during operation and the refueling of the fuel salt 109. During operation of the EMMSR 100, the fuel salt 109 is heated through the electrochemical reactions and power generation. After the fuel salt 109 is heated, the fuel salt 109 is released through at least one outlet 107. For example, the outlet 107 can be connected to the primary heat-exchanger. Or, the fuel salt 109 exiting through the outlet 107 can be fed back to the EMMSR 100 through the inlet 106 with or without chemical treatments. The flow rate of the fuel salt 109 entering inlet 106 and exiting outlet 107 can be controlled by circulation pumps, not pictured, configured to adjust the flow rate of the fuel salt 109.

The EMMSR 100 has a negative fuel salt 109 void coefficient Therefore, the fuel salt 109 is pushed through the at least one outlet 107, and the EMMSR 100 has a negative thermal reactivity feedback. This configuration avoids a set of major design constraints in prior art solid-fuel reactors. A passive core drain system activated by a melt plug enables draining the radioactive inventory into geometrically sub-critical drain tanks.

The control rods 108 are used to control the reactivity of the EMMSR 100 core individually or in combination with the refueling system. The control rods 108 are made from materials with strong neutron adsorption capabilities, such as silver-indium-cadmium alloys, high-boron steel, boron carbide, and hafnium alloys and borides. To avoid the contamination of the fuel salt 109 by the control rods 108, the control rods 108 must be stable in the fuel salt 109 or stable with a cladding protecting the control rod 108 from the fuel salt 109. If a cladding is used, the cladding surrounds the control rod 108. The cladding can be a ceramic or nickel-based alloy based material.

Figure 2A:
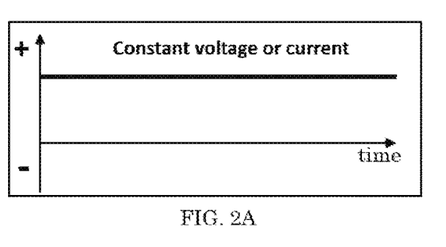
FIG. 2A illustrates an exemplary signal for the EMMSR from a regulated power source, according to an embodiment of the present invention.
Figure 2B:
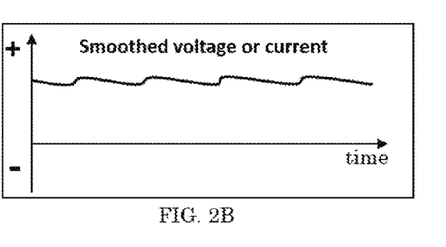
FIG. 2B illustrates an exemplary signal for the EMMSR from a smoothed power source, according to an embodiment of the present invention.
Figure 2C:
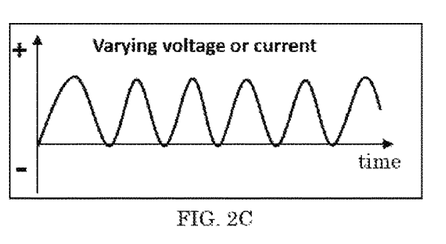
FIG. 2C illustrates an exemplary signal for the EMMSR from a power source without smoothing, according to an embodiment of the present invention.
Figure 2D:
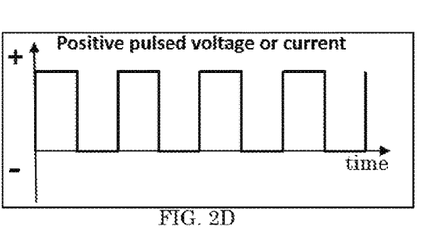
FIG. 2D illustrates an exemplary signal for the EMMSR with positive pulsed voltage or current, according to an embodiment of the present invention.
Figure 2E:
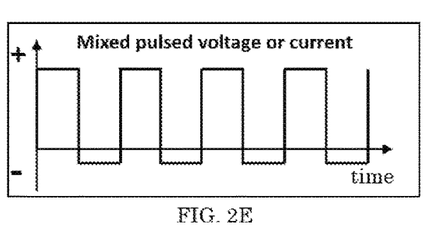
FIG. 2E illustrates an exemplary signal for the EMMSR with mixed positive-negative pulsed voltage or current, according to an embodiment of the present invention.
Figure 2F:
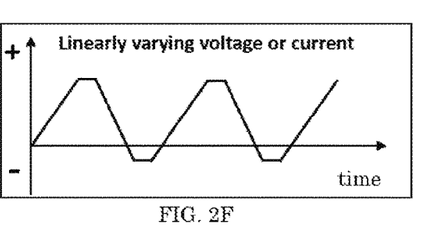
FIG. 2F illustrates an exemplary signal for the EMMSR with linearly varying voltage or current, according to an embodiment of the present invention.

Regarding electrical signals controlled by the power source 101 shown in FIG. 1 and employed for electrochemical modulation, they can be digital, analog, or their combinations. Typical DC signals are shown in FIGS. 2A-2F. FIG. 2A illustrates constant voltages or currents, from a battery or regulated power source FIG. 2B illustrates a smoothed power source. FIG. 2C illustrates a power source without smoothing FIG. 2D illustrates a positive pulsed voltage or current. FIG. 2E illustrates mixed positive-negative pulsed voltage or current. FIG. 2F illustrates a linearly varying voltage or current.

Figure 3:
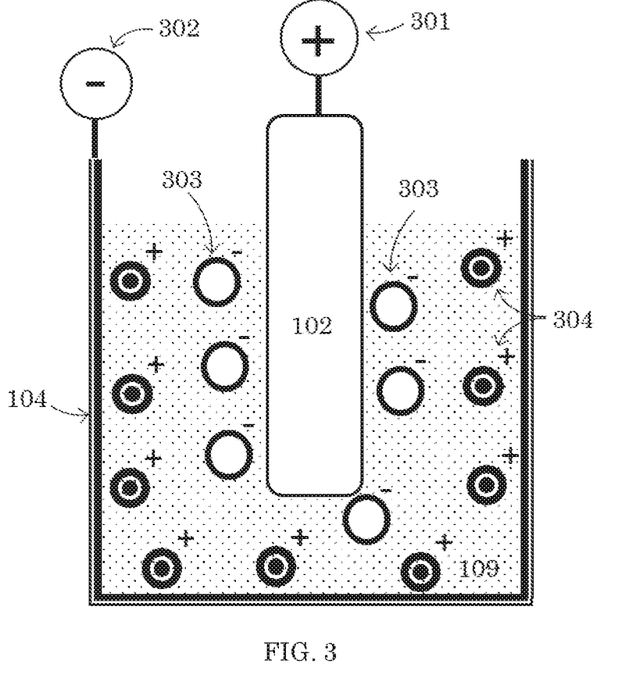
FIG. 3 is a simplified schematic illustration of the EMMSR to highlight the reactions that occur during operation, according to an embodiment of the present invention.

Referring to FIG. 3, a simplified illustration of an embodiment of the EMMSR 100 of FIG. 1 is shown to highlight the reactions that occur during operation. The neutron moderator 102 is connected to the positive end of the power source 101, not pictured, acting as the anode 301. The vessel 104 is connected to the negative end of the power source 101, not shown, acting as the cathode 302. During operation, a positive potential is applied to the neutron moderator 102 where anode 301 reactions occur during electrochemical modulation and, likewise, a negative potential is applied to the vessel 104 where cathode 302 reactions occur during electrochemical modulation. The voltage, which is the difference of the positive and negative potentials, time period, or frequency can be adjusted for optimized electrochemical modulation. The potential difference across the neutron moderator 102 and the vessel 104, the voltage, can be in a range between approximately 1-10 millivolts to 1-25 volts. Modulation is advantageous and effectively addresses challenges which have plagued traditional molten salt reactors such as neutron poisoning, excessive flux and power peaking, and vessel 104 and other component degradation. Advantages over the prior art include, but are not limited to, additional neutron moderation, decreased oxidation of the vessel 104, decreased degradation of the vessel 104 from harmful fission products.

The enrichment of anions 303 adjacent to the neutron moderator 102 and the enrichment of cations 304 adjacent to the vessel 104, driven by applying a positive potential to the neutron moderator 102 and a negative potential to the vessel 104, promote additional neutron moderation through the combination of the neutron moderator 102 and the fuel salt 109 because the fuel salt 109 provides additional neutron moderation. For example, referring to FIG. 4, in an embodiment of the EMMSR 100 using a fuel salt 109 made of LiF—BeF$_2$—UF$_4$, the salt anions 303, such as F$^-$, BeF$_4^{2-}$ and UF$_7^{3-}$, are rich around the neutron moderator 102 and the cations 304, such as Li$^+$, are rich close to the vessel 104. Because the elements, Be, F and C, have lower cross-sections for neutron adsorption than the element $^6$Li, the potential-induced charge separation and ion-enrichment can promote the moderation of neutrons in the EMMSR 100 through the combination of Be, F and C, and mitigate the neutron adsorption by the impurity $^6$Li which is normally present in highly-purified $^7$Li salt. Furthermore, the above neutron moderation is a gradient along the distance away from the neutron moderator 102. In other words, moderation becomes weaker with increasing distance away from the neutron moderator 102.

Figure 4:
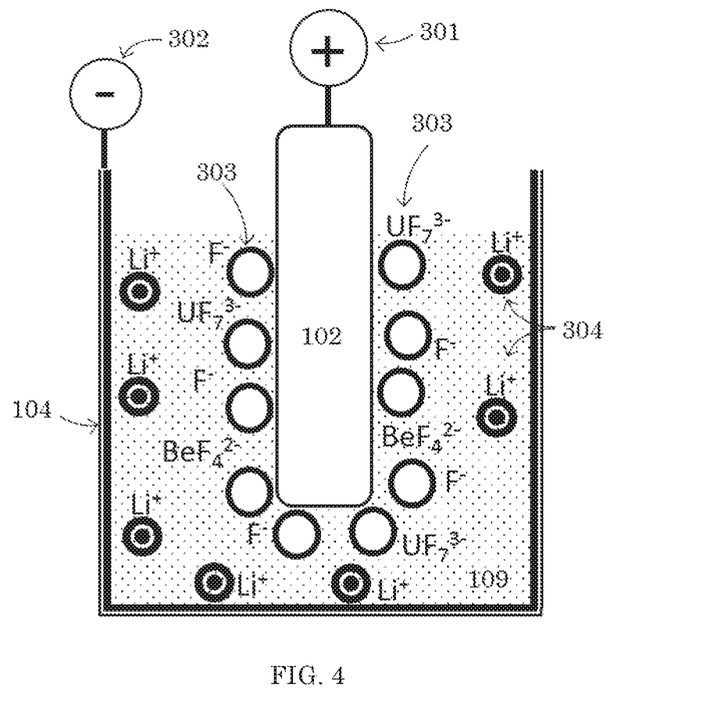
FIG. 4 is a simplified schematic illustration of the EMMSR to highlight the reactions that occur during operation, according to an embodiment of the present invention.

The movement of UF$_7^{3-}$ from the zone adjacent to the vessel 104 inner surfaces to the neutron moderator 102 decreases its oxidative attack on the vessel 104 through the reactions represented in Equations 1, 2 and 3, also mitigating the vessel 104 corrosion induced by the U(IV) species.

$$Cr+2UF_7^{3-}+2F^- \rightarrow CrF_2+2UF_7^{4-} \quad (1)$$

$$Ni+2UF_7^{3-}+2F^- \rightarrow NiF_2+2UF_7^{4-} \quad (2)$$

$$Fe+2UF_7^{3-}+2F^- \rightarrow FeF_2+2UF_7^{4-} \quad (3)$$

When the voltage across the anode 301 and the cathode 302 is high enough to sufficiently trigger the reaction of Equation 11, the reductive conversion of U(IV) to U(III) can mitigate the oxidation of the vessel 104 by U(IV).

$$UF_7^{3-}+e^-(\text{electron}) \rightarrow UF_7^{4-} \quad (4)$$

Therefore, the redox corrosion of the vessel 104 in the EMMSR can be significantly reduced through the potential-modulated charge separation and electrochemical reactions. Therefore, the vessel 104 does not need metallic Be, U and Zr, or the salt of U(III) which have been used in the traditional MSRs for mitigating the corrosion of the vessel 104 by the strongly oxidative U(IV) species. Because electrons are much "cleaner" and "safer" than the above reductive metals or salts, the EMMSR 100 is also a cleaner and safer technology than the traditional MSRs.

In the EMMSR, a potential modulation can also mitigate vessel 104 degradation by two harmful fission products, Te and $^3$T, through their oxidation at the anode 301 as shown in Equations 5 and 6.

$$Te-xe^-+xF^- \rightarrow TeF_x \quad (5)$$

$$^3T-e^-+F^- \rightarrow {}^3TF \quad (6)$$

Besides the reactions shown in Equations 5 and 6, Te and $^3$T are likely to be oxidized by the U(IV) species. Their corresponding oxidized products TeF$_x$ and $^3$TF can be removed from the salt by purging He or Ar through the salt. Therefore, the embrittlement of nickel-based vessel 104 induced by Te and $^3$T (Equations 7 and 8) can be significantly mitigated in the EMMSR 100.

$$3F^-+UF_4 \leftrightarrow UF_7^{3-} \quad (7)$$

$$Cr+2HF \rightarrow CrF_2+H_2 \quad (8)$$

Because the EMMSR 100 is capable of reducing the formation of $^3$T through the potential-induced charge separation described previously, and remove $^3$T through the reaction shown in Equation 6, it could decrease the demand of ultra-high purity salt of $^7$Li which is also a challenge for prior art molten salt reactors. As a result, the cost of the fuel salt 109 can be reduced and its purification can be simplified.

In the EMMSR 100, the corrosion of the vessel 104 can be also mitigated through electrochemical reduction of corrosion products such as $CrF_2$ and $FeF_2$ based upon the reactions shown in Equations 10 to 12.

$$CrF_2 + 2e^- \rightarrow Cr + 2F^- \tag{10}$$

$$FeF_2 + 2e^- \rightarrow Fe + 2F^- \tag{11}$$

$$NiF_2 + 2e^- \rightarrow Ni + 2F^- \tag{12}$$

One further advantage of the potential modulation is to control the release of elemental fission products such as Cs and I through their anode and cathode reactions respectively as shown in Equations 13 and 14.

$$Cs - e^- + F^- \rightarrow CsF \tag{13}$$

$$3I + e^- \rightarrow I_3^- \tag{14}$$

The use of mixed pulsed voltage or current, as shown in FIG. 2E, or linearly varying signal, FIG. 2F, can drive the anode reactions to occur on the vessel 104 and the cathode reaction to occur on the neutron moderator 102, when a negative potential is applied to the neutron moderator 102. This can be done to remove reductive U deposited on the vessel 104 bottom as shown in Equation 15. The re-dissolution of U deposit from the vessel 104 solution into the fuel salt 109 can prevent local over-heating caused by deposited U and increase the lifetime of the vessel.

$$U - 3e^- - 7F^- \rightarrow UF_7^{4-} \tag{15}$$

Figure 5:
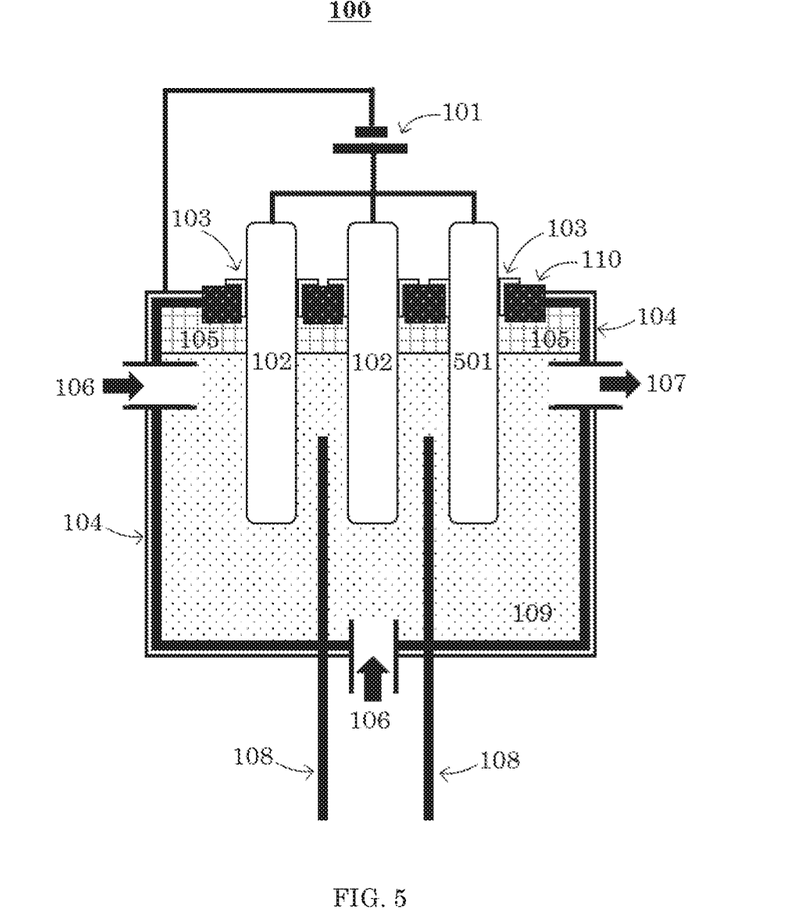
FIG. 5 is a schematic illustration of the EMMSR, according to an embodiment of the present invention, having a supporting electrode.

Turning to FIG. 5, an embodiment of the EMMSR 100 is shown. In addition to the components discussed in reference to FIG. 1, at least one supporting electrode 501 is introduced into the EMMSR 100. The supporting electrode 501 is configured to catalyze particular anode reactions that improve the power generation efficiency of the EMMSR 100. The supporting electrode 501 would have chemical stability in the fuel salt 109 and low neutron-adsorption cross-sections. For example, the supporting electrode 501 could be made from metals and alloys of nickel, platinum, ruthenium, molybdenum, and palladium. A supporting electrode 501 can also be coated onto a carbon substrate such as a graphite rod. For example, a supporting electrode 501 made from palladium coated onto a graphite rod would catalyze the reactions shown in Equations 12, 13, 17, and 18. Because the supporting electrode 501 is a catalyst for these reactions, and by comparison has a higher activity for these reactions than the neutron moderator 102, the overall power efficiency of the reactor is improved. More than one supporting electrode 501 can be used in the EMMSR 100, each supporting electrode 501 meant to catalyze different selected reactions.

Figure 6:
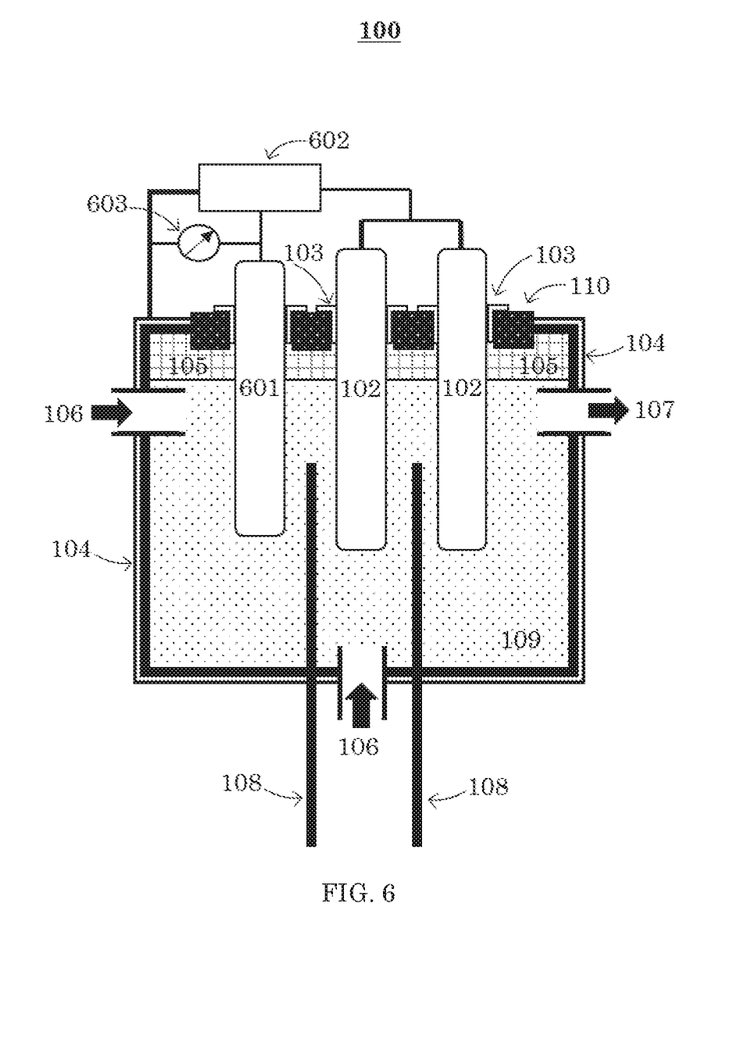
FIG. 6 is a schematic illustration of the EMMSR, according to an embodiment of the present invention, having a supporting electrode and a reference electrode.

In FIG. 6, an embodiment of the EMMSR 100 is shown. In addition to the components discussed in reference to FIG. 1, at least one reference electrode 601 is introduced into the EMMSR 100. The reference electrode 601 allows for more accurate modulation of electrical signals, the tuning of electrochemical reactions at the neutron moderator 102 and vessel 104, the monitoring of the fuel salt 109 chemistry, and better control of the EMMSR 100. The electric potential of the reference electrode 601 facilitates the measurement of the voltage between the vessel 104 and the reference electrode 601 using a voltmeter 603, or a potentiostat or galvanostat 602. The potentiostat or galvanostat 602 tunes the electrochemical reactions occurring at the neutron moderator 102 or on the vessel 104. The at least one reference electrode 601 can be ordinary reference electrodes, dynamic reference electrodes, or combinations of ordinary and dynamic reference electrodes can be used. Examples of ordinary reference electrodes include Ag/AgCl, Ni/NiO, and Ni/Ni/ZrO$_2$. A dynamic reference electrode refers to electrodes that can build up stable interfacial potentials after the dynamic electrode is in contact with the fuel salt 109. Examples of dynamic reference electrodes include Be. When the reference electrode 601 is in the fuel salt 109, a porous ceramic filter is used to separate the internal electrolyte used inside the reference electrode 601 from the fuel salt 109. In a fuel salt 109 made from molten fluorides, the filter could be as simple as Ni, Co and W wires for a reference electrode 601 made from carbon.

Because the response of the potential of a reference electrode 601 to the chemistry of the fuel salt 109, or other operating parameters such as temperature, is unique, the reference electrode 601 provides a mechanism to monitor the fuel salt 109 chemistry and even the safety of the EMMSR 100 based on changes of the reference electrode 601 potential. An array of reference electrodes 601 can be used to improve the reliability of the monitoring of the EMMSR 100. The potential differences between the reference electrodes 601 provide statistical information about the fuel slat chemistry and the operation conditions.

Figure 7:
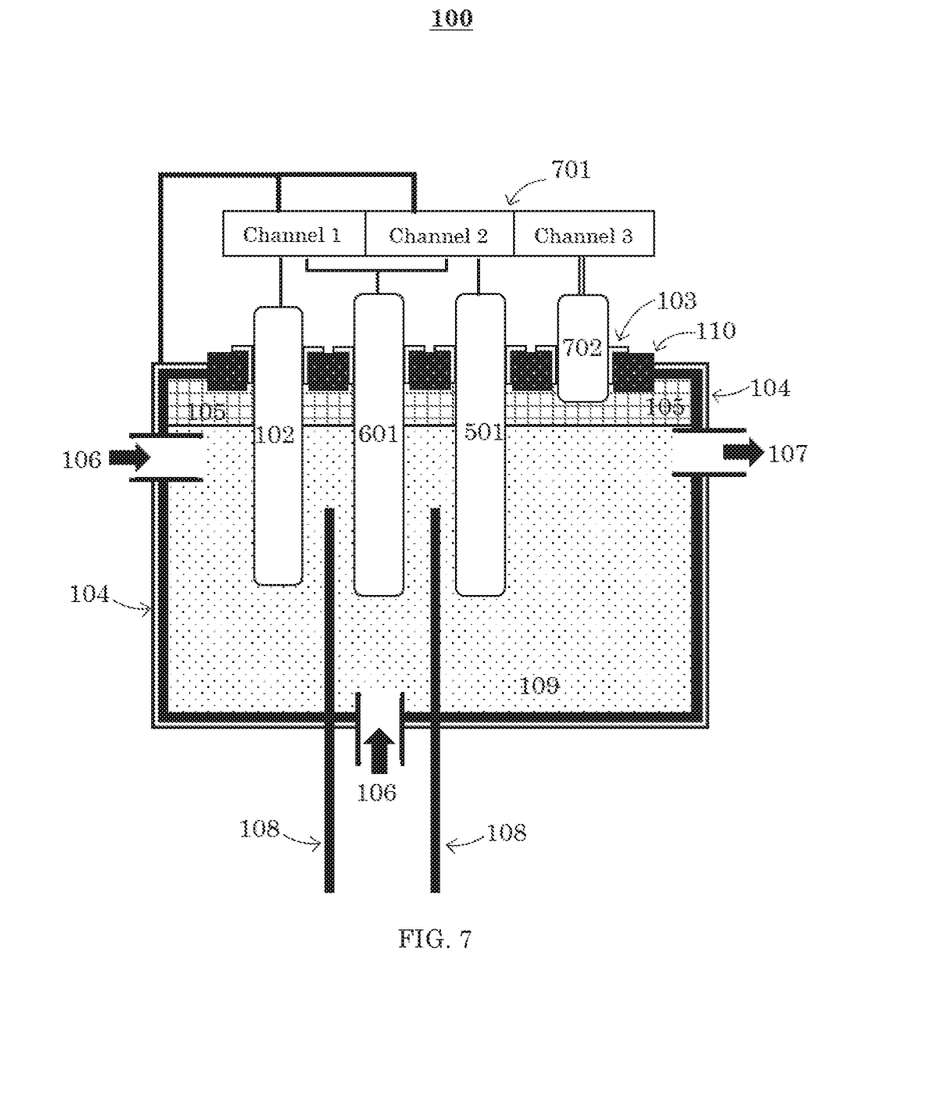
FIG. 7 is a schematic illustration of the EMAISR, according to an embodiment of the present invention, having a supporting electrode, a reference electrode, and a gas sensor.

In FIG. 7 another embodiment of the present invention is shown. In addition to the components discussed in reference to FIG. 1, a multi-channel potentiostat or galvonostat 701 is introduced into the EMMSR 100. A multi-channel potentiostat or galvonostat 701 allows for independent control of each neutron moderator 102 and supporting electrode 501. The reference electrode 601 can be an array of electrodes. During modulation of the EMMSR 100, each channel of the potentiostat or galvonostat 701 can be connected to the neutron moderator 102, reference electrode 601, supporting electrode 501, or electrochemical gas sensor 702. The vessel 104 can also be used as a common electrode connected to more than one channel. To monitor the fission products and other volatiles in the gas phase 105 that are released from the fuel salt 109, at least one electrochemical gas sensor 702 can be introduced into the gas phase 105 and controlled by the multi-channel potentiostat or galvonostat 701. The electrochemical gas sensor 702 can be any sensor capable of withstanding the environment conditions within the gas phase 105 and provide the necessary data to be acquired. For example, the electrochemical gas sensor 702 can be an $I_2$ sensor, a BF sensor, a Sr sensor, or an $O_2$ sensor. The electrochemical gas sensor 702 can considerably improve the monitoring and control of the EMMSR 100, resulting in improved performance and safety.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

Any element in a claim that does not explicitly state "means for" performing a specified function, or "step for" performing a specific function, is not to be interpreted as a "means" or "step" clause as specified in 35 U.S.C. § 112, ¶ 6. In particular, the use of "step of" in the claims herein is not intended to invoke the provisions of 35 U.S.C. § 112, ¶ 6.

The invention claimed is:

1. An electrochemically modulated molten salt reactor (EMMSR) comprising:

a nuclear reactor vessel and a power source;

the nuclear reactor vessel contains a nuclear fuel salt, at least partially contains a neutron moderator, and at least partially contains an insulator, the nuclear fuel salt including dissolved fissile isotopes wherein the concentration of the fissile isotopes during operation of the EMMSR is sufficient to cause continued self-sustaining fission reactions, the neutron moderator configured to slow down fast neutrons produced by the dissolved fissile isotopes, the insulator configured to electrically isolate the neutron moderator from the nuclear reactor vessel;

the power source having a positive potential and a negative potential, the positive potential is received by the neutron moderator, and the negative potential is received by the nuclear reactor vessel; and a holder, the holder stabilizes the neutron moderator and the insulator in communication with the vessel.

2. The electrochemically modulated molten salt reactor of claim 1 wherein the neutron moderator includes at least one of: conductive carbon, a metal, or an alloy.

3. The electrochemically modulated molten salt reactor of claim 1, wherein the nuclear fuel salt includes fluorides, chlorides, or a combination of fluorides and chlorides.

4. The electrochemically modulated molten salt reactor of claim 1, wherein the nuclear fuel salt is $LiF-BeF_2-UF_4$.

5. The electrochemically modulated molten salt reactor of claim 1, wherein the dissolved fissile isotopes include an actinide element.

6. The electrochemically modulated molten salt reactor of claim 1, wherein the dissolved fissile isotopes are present within the nuclear fuel salt up to approximately 15 wt %.

7. The electrochemically modulated molten salt reactor of claim 1, wherein the dissolved fissile isotopes are present within the nuclear fuel salt between approximately 1 wt % and approximately 10 wt %.

8. The electrochemically modulated molten salt reactor of claim 1, wherein the neutron moderator includes conductive carbon, conductive metals, alloys, or a combination of conductive carbon, conductive metals, or alloys.

9. The electrochemically modulated molten salt reactor of claim 1, wherein the neutron moderator is a composite of conductive carbons, conductive metals, or oxides of Zr and Be.

10. The electrochemically modulated molten salt reactor of claim 1, wherein the electrochemically modulated molten salt reactor operates in the temperature range of approximately 500° C. and 800° C.

11. The electrochemically modulated molten salt reactor of claim 1, additionally comprising:

at least one supporting electrode, the supporting electrode configured to catalyze chemical reactions that occur within the electrochemically modulated molten salt reactor.

12. The electrochemically modulated molten salt reactor of claim 1, additionally comprising:

at least one reference electrode, the reference electrode configured to modulate the positive potential and negative potential.

13. The electrochemically modulated molten salt reactor of claim 12 wherein the reference electrode is a dynamic reference electrode.

14. The electrochemically modulated molten salt reactor of claim 12, additionally comprising:

a volt meter with a potentiostat or galvanostat.

15. The electrochemically modulated molten salt reactor of claim 1, additionally comprising:

a gas phase disposed within the nuclear reactor vessel, the gas phase configured to hold gaseous fission products produced from the nuclear fuel salt.

16. The electrochemically modulated molten salt reactor of claim 1 further comprising at least one control rod, the control rod configured to control the continued self-sustaining fission reactions of the nuclear fuel salt.

* * * * *